(12) United States Patent
Liao

(10) Patent No.: US 12,254,407 B2
(45) Date of Patent: Mar. 18, 2025

(54) STORAGE AND INFERENCE METHOD FOR DEEP-LEARNING NEURAL NETWORK

(71) Applicant: HUITONG INTELLIGENCE COMPANY LIMITED, Taipei (TW)

(72) Inventor: Yen-Chin Liao, Hsinchu (TW)

(73) Assignee: HUITONG INTELLIGENCE COMPANY LIMITED, Taipei (TW)

( * ) Notice: Subject to any disclaimer, the term of this patent is extended or adjusted under 35 U.S.C. 154(b) by 885 days.

(21) Appl. No.: 17/402,970

(22) Filed: Aug. 16, 2021

(65) Prior Publication Data

US 2022/0405577 A1 Dec. 22, 2022

(30) Foreign Application Priority Data

May 31, 2021 (TW) ................. 110119690

(51) Int. Cl.
*G06N 3/045* (2023.01)
*G06N 3/08* (2023.01)

(52) U.S. Cl.
CPC ............... *G06N 3/08* (2013.01); *G06N 3/045* (2023.01)

(58) Field of Classification Search
CPC .................................. G06N 3/08; G06N 3/045
See application file for complete search history.

(56) References Cited

U.S. PATENT DOCUMENTS

2014/0143194 A1* 5/2014 Yoon .................. G06N 3/049
706/25
2017/0364799 A1 12/2017 Liu et al.
(Continued)

FOREIGN PATENT DOCUMENTS

CN 105554873 A 5/2016
CN 108537328 A 9/2018
(Continued)

OTHER PUBLICATIONS

Jack P. K. Ma and Raymond K. H. Tai, et al., "Let's Stride Blindfolded in a Forest: Sublinear Multi-Client Decision Trees Evaluation", Network and Distributed Systems Security (NDSS) Symposium 2021, Feb. 21-25, 2021. DOI:10.14722/ndss.2021.23166.

(Continued)

*Primary Examiner* — Beau D Spratt
(74) *Attorney, Agent, or Firm* — The Roy Gross Law Firm, LLC; Roy Gross

(57) ABSTRACT

A storage and inference method for a deep-learning neural network comprises steps: establishing dummy nodes in a first artificial neural network to form a second artificial neural network; storing model parameters of the second artificial neural network in a first storage area, and storing parameters of the dummy nodes in a second storage area; and in inference, respectively retrieving the model parameters of the second artificial neural network and the parameters of the dummy nodes from the first storage area and the second storage area simultaneously; deleting interconnections between the dummy nodes of the second artificial neural network or setting the interconnections between the dummy nodes of the second artificial neural network to 0 according to the parameters of the dummy nodes before inference. The present invention prevents ANN from be deciphered through respectively storing model parameters and parameters of the dummy nodes in different locations.

8 Claims, 6 Drawing Sheets

(56) References Cited

U.S. PATENT DOCUMENTS

| | | | |
|---|---|---|---|
| 2018/0039880 A1* | 2/2018 | Tsutsui | G06N 3/063 |
| 2020/0210835 A1 | 7/2020 | Subbaraya et al. | |
| 2020/0210836 A1 | 7/2020 | Kim et al. | |
| 2021/0019184 A1 | 1/2021 | Vee et al. | |
| 2021/0019893 A1 | 1/2021 | Ananthanarayanan et al. | |
| 2021/0325497 A1* | 10/2021 | Meyer | G01R 33/543 |
| 2022/0067499 A1* | 3/2022 | Tran | G11C 16/24 |
| 2023/0076947 A1* | 3/2023 | Rasmus-Vorrath | G01J 1/4228 |

FOREIGN PATENT DOCUMENTS

| | | |
|---|---|---|
| CN | 110674941 A | 1/2020 |
| CN | 111837141 A | 10/2020 |
| CN | 112070227 A | 12/2020 |
| CN | 215376333 U | 12/2021 |
| JP | H09167195 A | 6/1997 |
| JP | 2019046460 A | 3/2019 |
| TW | I634488 B | 9/2018 |

OTHER PUBLICATIONS

H. Dong, C. Wu, Z. Wei and Y. Guo, "Dropping Activation Outputs With Localized First-Layer Deep Network for Enhancing User Privacy and Data Security," IEEE Transactions on Information Forensics and Security, vol. 13, No. 3, IEEE, Mar. 2018, pp. 662-670. doi: 10.1109/TIFS.2017.2763126.

A. Boulemtafes, A. Derhab, Y. Challal, "A review of privacy-preserving techniques for deep learning", Neurocomputing, vol. 384, pp. 21-45, Elsevier, Aug. 25, 2020. https://doi.org/10.1016/j.neucom.2019.11.041.

Xue Jianbin; Chang Xinliang; "Mobile beacon path planning of UWSNs based on Hopfield neural network"; Transducer and Microsystem Technologies 4, 2020, 35-38, 42, 5 pages in total.

Ma Haili; "Research and Design of Security Monitoring System Based on Cloud Computing Platform"; Internet Technology;Chinese Master's Theses Full-text Database; Master's Theses; Mar. 28, 2019.

Vega-Garcia, C. et al. "Applying neural network technology to human-caused wildfire occurrence prediction"; AI Applications 1996, vol. 10, No. 3, pp. 9-18 ref. 28; Department of Forest Science, 751 General Services Building, University of Alberta, Edmonton, Alberta, T6G 2H1, Canada.

Taiwan Intellectual Property Office, Office Action for Taiwan Patent Application No. 110119690, dated Apr. 11, 2022, 10pp.

Chinese Office Action for Chinese Patent Application No. 202110673578.3, dated Apr. 10, 2024, 6pp.

* cited by examiner

STORAGE AND INFERENCE METHOD FOR DEEP-LEARNING NEURAL NETWORK

This application claims priority of application Ser. No. 110119690 filed in Taiwan on 31 May 2021 under 35 U.S.C. § 119; the entire contents of all of which are hereby incorporated by reference.

BACKGROUND OF THE INVENTION

Field of the Invention

The present invention relates to an artificial neural network technology, particularly to a storage and inference method for a deep-learning neural network.

Description of the Prior Art

The artificial neural network (ANN) is also called the fuzzy neural network or called the neural network in brief. In the fields of machine learning and recognition science, ANN is a mathematical or computational model simulating the structure and function of the central nervous system of an organism and used to estimate or approximate functions.

Deep learning is a branch of machine learning. ANN includes three layers of neurons. Refer to FIG. 1. An artificial neural network 50 includes an input layer 502, a concealment layer 504 and an output layer 506. The concealment layer 504 is interposed between the input layer 502 and the output layer 504, not participating in input or output but dedicated to transferring or processing data. While the artificial neural network 50 has more than one concealment layer 504, the artificial neural network 50 is called a deep-learning neural network. Each layer contains a plurality of nodes 52. The link between one node 52 and another node 52 is called the interconnection 54. Each interconnection 54 has a weight. The interconnections 54 between the nodes 52 and the weights of the interconnections 54 may be used to define an artificial neural network 50. The interconnections 54 are normally fixed. Massive data may be used in model training to obtain the values of the weights. However, weight values may be random. The trained deep-learning neural network may store model parameters, such as weights and interconnections 54. Considering safety, the deep-learning neural network 50 should be encrypted. Thus, decryption is needed before the deep-learning neural network 50 is used in inference.

Accordingly, the present invention proposes a storage and inference method for a deep-learning neural network, wherein a special method is used to store model parameters and achieve an encryption effect, whereby to solve the abovementioned problems. The principles and embodiments of the present invention will be described in detail below.

SUMMARY OF THE INVENTION

The primary objective of the present invention is to provide a storage and inference method for a deep-learning neural network, which stores the model parameters of an artificial neural network in different storage areas, whereby even though a hacker obtains a portion of the model parameters, only the portion of the model parameters cannot enable the hacker to use the artificial neural network for inference.

Another objective of the present invention is to provide a storage and inference method for a deep-learning neural network, which establishes a plurality of dummy nodes in an artificial neural network to vary the model parameters of the artificial neural network, and which separately stores the new model parameters and the parameters of the dummy nodes.

A further objective of the present invention is to provide a storage and inference method for a deep-learning neural network, wherein the dummy nodes are not deleted in inference, and wherein the interconnections between the dummy nodes are deleted or set to 0, whereby the architecture of the artificial neural network will not be changed once again.

In order to achieve the abovementioned objectives, the present invention proposes a storage and inference method for a deep-learning neural network, which comprises steps: establishing a plurality of dummy nodes in a first artificial neural network to form a second artificial neural network; storing the model parameters of the second artificial neural network in a first storage area, and storing the parameters of the dummy nodes in a second storage area; while inference is to be undertaken, retrieving the model parameters of the second artificial neural network from the first storage area and retrieving the parameters of the dummy nodes from the second storage area simultaneously, deleting the interconnections between the dummy nodes in the second artificial neural network or setting the interconnections between the dummy nodes in the second artificial neural network to 0 according to the parameters of the dummy nodes before inference.

In one embodiment, a method for establishing dummy nodes of the present invention comprises steps: inserting dummy nodes into the first artificial neural network to vary the architecture of the first artificial neural network; and generating a plurality of interconnections between the dummy nodes, and randomly assigning weights to the interconnections to form a second artificial neural network.

In one embodiment, a method for establishing dummy nodes of the present invention comprises steps: finding a plurality of blank nodes or nodes of very low utilization rate and setting them as dummy nodes; and setting the weights of interconnections between dummy nodes to be zero to form a second artificial neural network.

In one embodiment, after the second artificial neural network has been trained, random values are assigned to the weights of the interconnections between the dummy nodes.

In one embodiment, a method for establishing dummy nodes of the present invention comprises steps: in training the first artificial neural network, setting the dropout ratio to be a number greater than 0 and smaller than or equal to 1; after setting the ratio of all the nodes in the first artificial neural network to 0, recording the training process of the first artificial neural network, wherein a plurality of nodes may be randomly deleted in the training process; selecting an optimized configuration during the training process of the first artificial neural network, and restoring the deleted nodes in the optimized configuration to the original positions, and setting the restored nodes to be dummy nodes; assigning random values to the weights of the interconnections between the dummy nodes to form a second artificial neural network.

In one embodiment, the optimized configuration involves one of the lowest mean square loss, the lowest cross entropy loss, the highest similarity, or the highest accuracy, or involves a combination of at least two of them.

In one embodiment, the first storage area and the second storage area are respectively located at different databases.

In one embodiment, the first storage area and the second storage area are linked to a host computer for undertaking inference.

In one embodiment, the first storage area and or the second storage area is located at a host computer, and the host computer is used to undertake inference.

DETAILED DESCRIPTION OF THE INVENTION

The present invention proposes a storage and inference method for a deep-learning neural network, which comprises steps: establishing a plurality of dummy nodes in the primitive structure (a first artificial neural network) to form a second artificial neural network; storing the model parameters of the second artificial neural network in a first storage area, and storing the parameters of the dummy nodes in a second storage area: while inference is to be undertaken, retrieving the model parameters of the second artificial neural network from the first storage area and retrieving the parameters of the dummy nodes from the second storage area simultaneously, deleting the interconnections between the dummy nodes in the second artificial neural network or setting the interconnections between the dummy nodes in the second artificial neural network to 0 according to the parameters of the dummy nodes before inference, and separately storing the parameters of the dummy nodes and the whole model parameters of the artificial neural network. Thereby, even though someone obtains the model parameters, he is still unlikely to acquire the model of the artificial neural network to undertake inference because he lacks the parameters of the dummy nodes. The present invention transforms the dummy nodes to play an encryption role, wherein the computation and storage of the dummy nodes is used to increase the time of encryption and decryption.

Figure 2A:
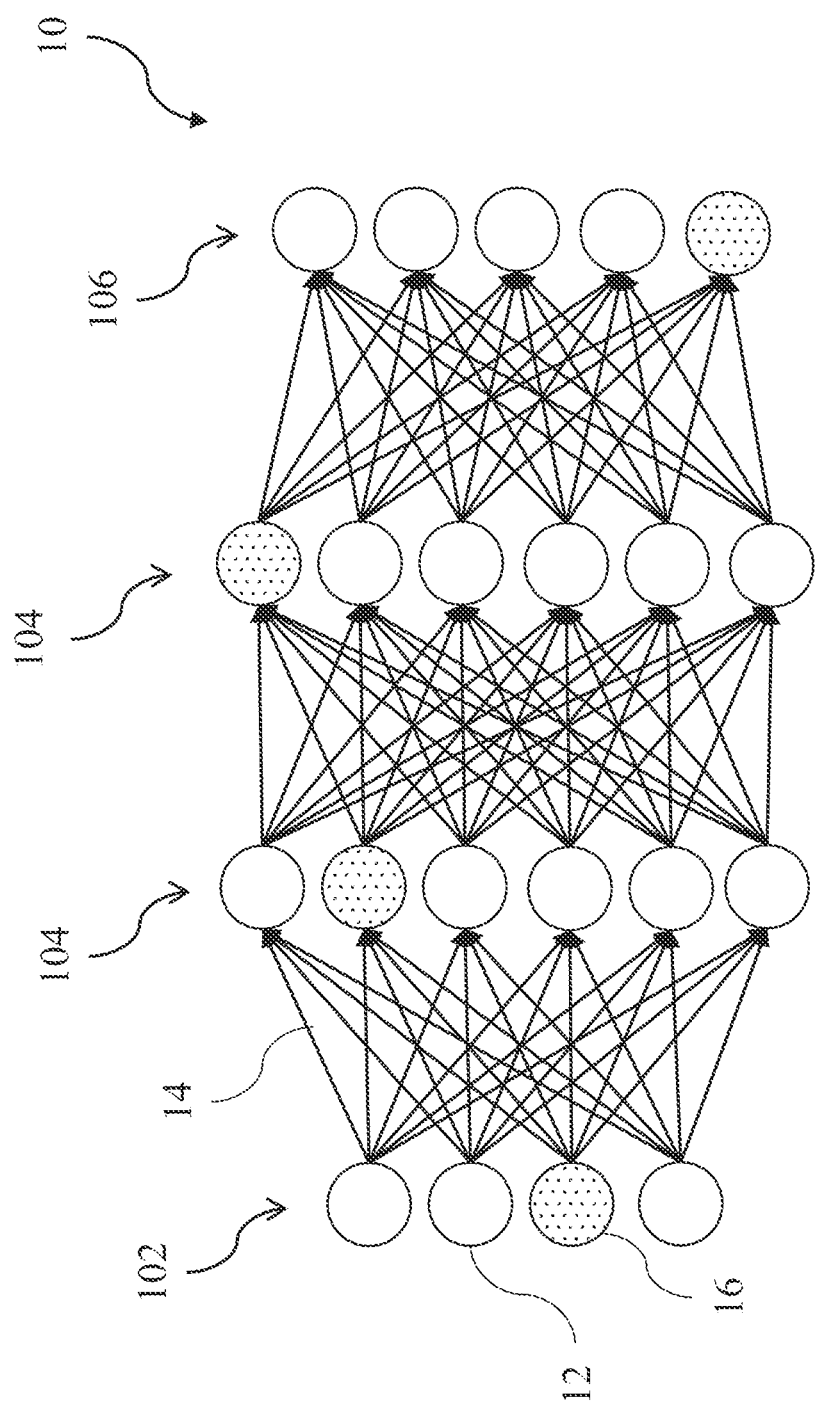
FIG. 2A and FIG. 2B are diagrams respectively showing methods for establishing dummy nodes according to embodiments of the present invention.
Figure 2B:
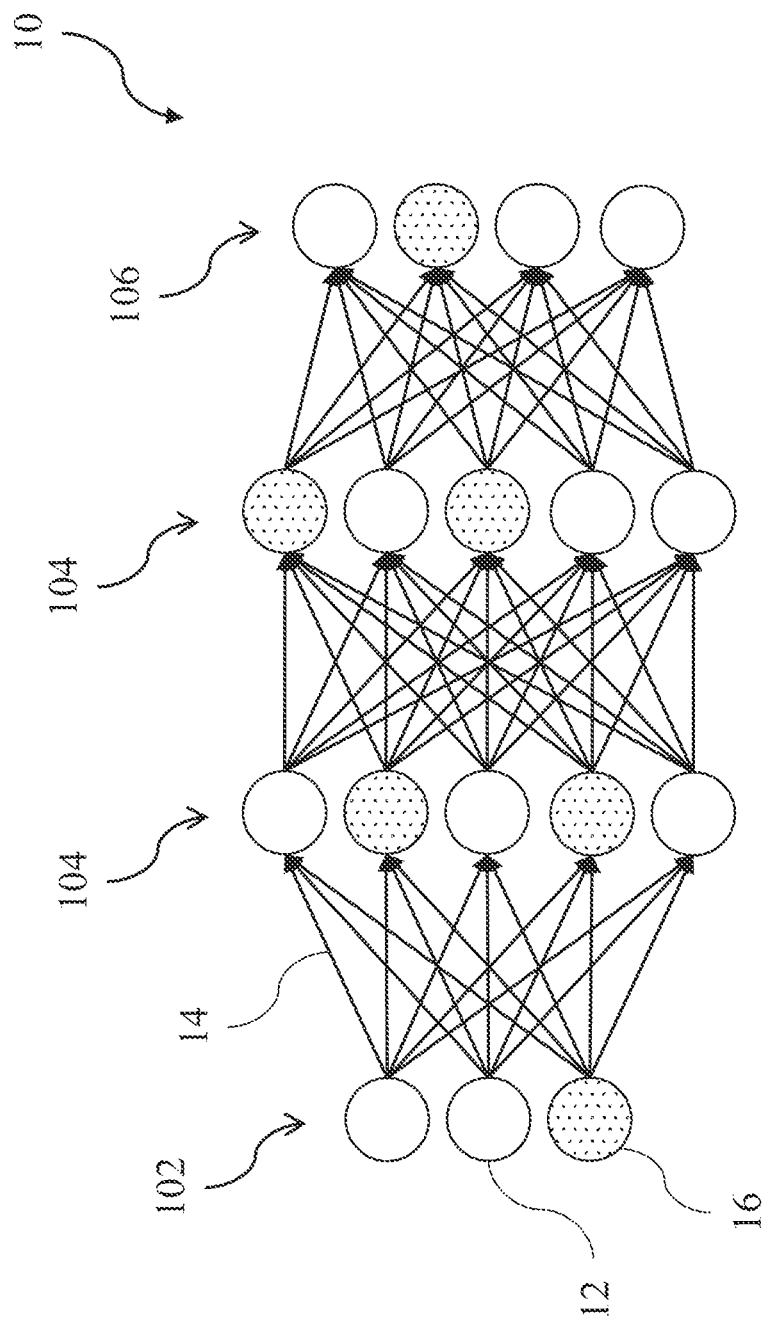
Figure 3:
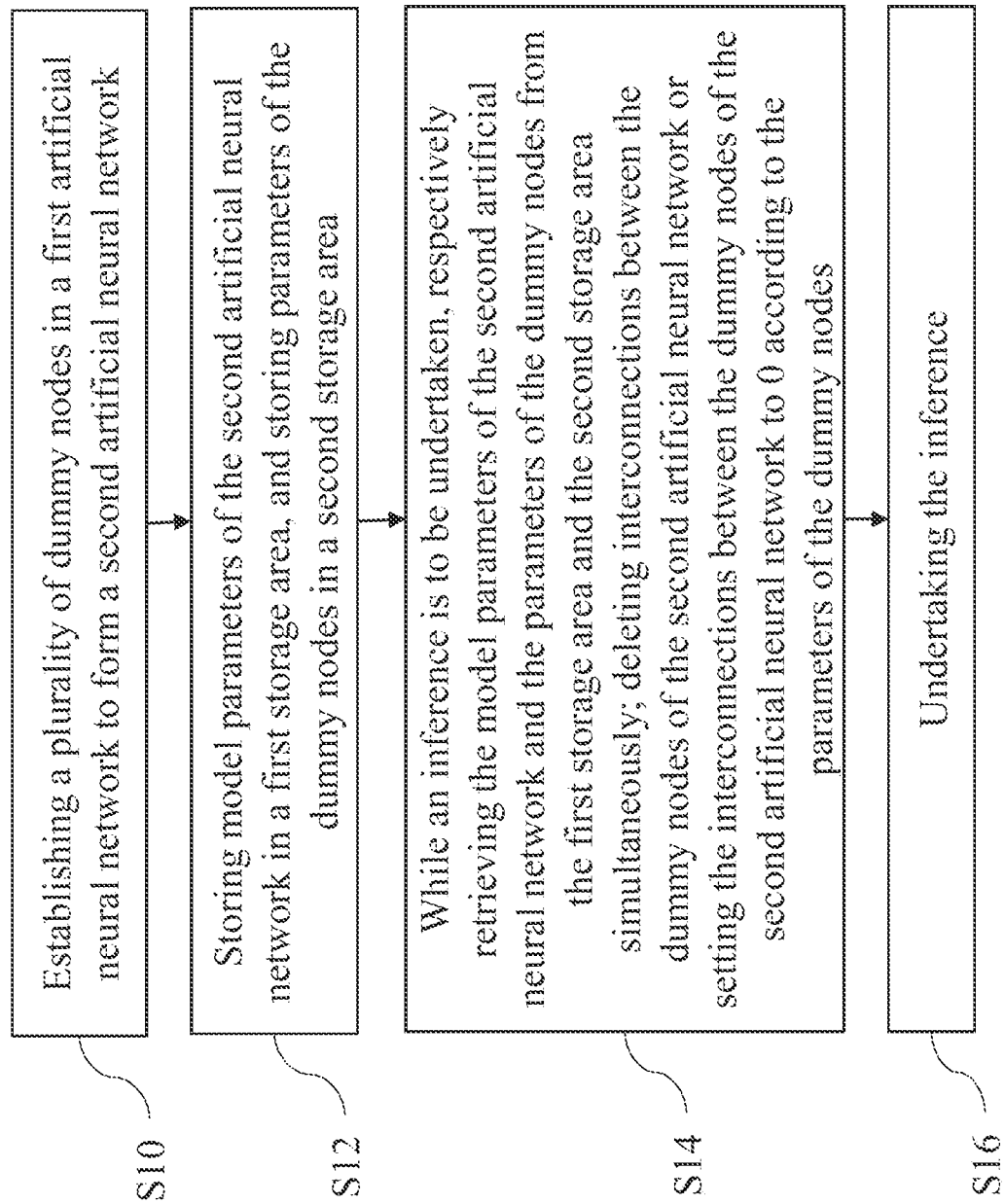
FIG. 3 is a flowchart of a storage and inference method for a deep-learning neural network according to one embodiment of the present invention.

Refer to FIG. 2B and FIG. 3, which are respectively a diagram and a flowchart schematically showing an embodiment of establishing dummy nodes of a storage and inference method for a deep-learning neural network of the present invention. In FIG. 2B, the artificial neural network 10 includes an input layer 102, two concealment layers 104 and an output layer 106. The artificial neural network 10 is a deep-learning neural network because the number of the concealment layers 104 is greater than 1. Each layer of the artificial neural network 10 includes a plurality of nodes 12. The link between one node 12 and another node 12 is an interconnection 14. Each interconnection 14 has a weight. The interconnections 14 between nodes 12 and the weights thereof may be used to define the artificial neural network 10. The present invention establishes a plurality of dummy nodes 16. What is shown in FIG. 2B is only an embodiment of establishing the dummy nodes 16.

The storage and inference method for a deep-learning neural network of the present invention comprises Steps S10-S16. In Step S10, establish a plurality of meaningless dummy nodes 16 in a first artificial neural network to form a second artificial neural network, wherein it is unnecessary to establish the dummy nodes 16 in every layer. In Step S12, store the model parameters of the second artificial neural network in a first storage area, and store the parameters of the dummy nodes 16 in a second storage area. In this embodiment, the model parameters include the parameters of the nodes 12 and the parameters of the dummy nodes 16. In Step S14, while inference is to be undertaken, respectively retrieve the model parameters of the second artificial neural network and the parameters of the dummy nodes 16 from the first storage area and the second storage area at the same time; delete the interconnections between the dummy nodes 16 of the second artificial neural network or set the interconnections between the dummy nodes 16 of the second artificial neural network to 0 according to the parameters of the dummy nodes 16. Then, in Step S16, use the second artificial neural network to undertake inference.

Figure 1:
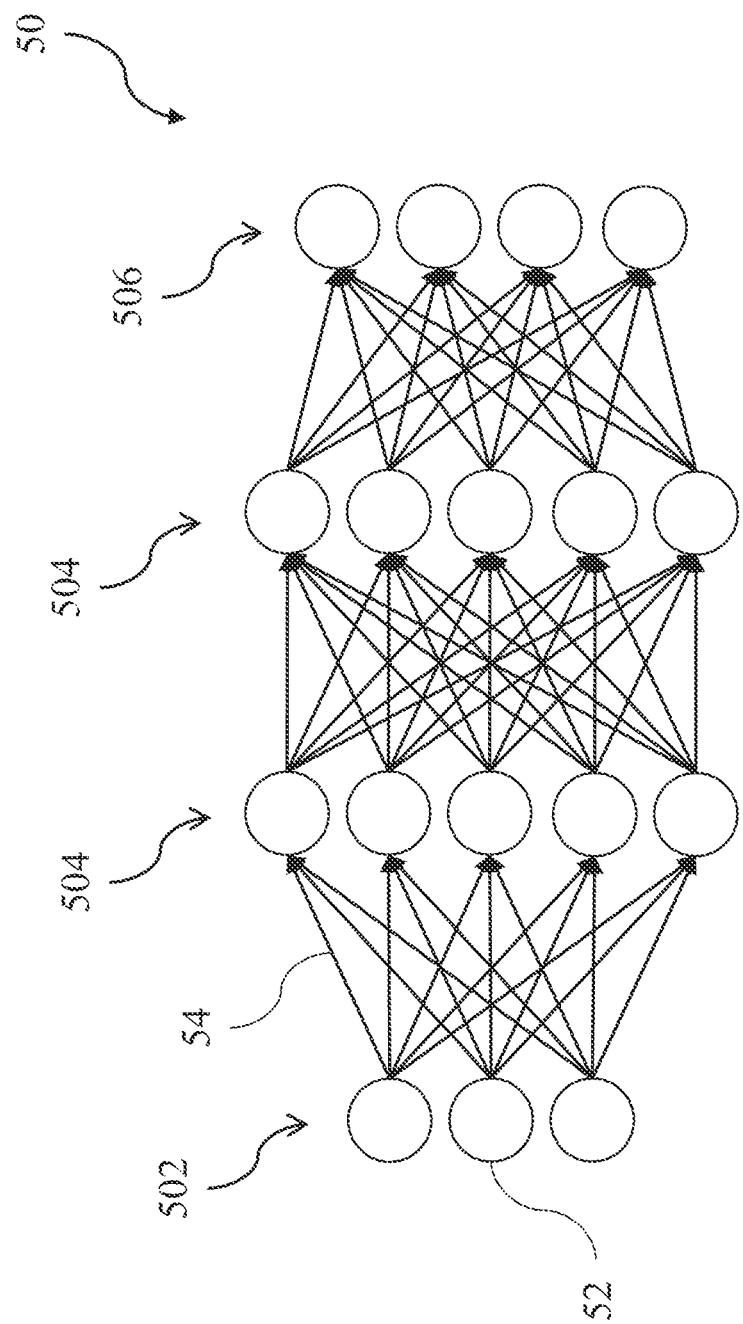
FIG. 1 is a diagram schematically showing an architecture of a deep-learning neural network.

In Step S10, there are several methods for establishing the dummy nodes 16 in the first artificial neural network, and three methods are described below. Suppose that the first artificial neural network is the artificial neural network 50 shown in FIG. 1.

As shown in FIG. 2A, a first method for establishing the dummy nodes 16 includes a step: inserting dummy nodes 16 into the first artificial neural network 50 to increase the total number of the nodes and vary the architecture of the first artificial neural network 50. In the example shown by FIG. 2A, each layer has a single dummy node 16 inserted. Next, generate a plurality of interconnections 14 between the dummy nodes 16, including the interconnections between the nodes 12 and the dummy nodes 16 and the interconnections entirely between the dummy nodes 16. In order to make the artificial neural network seem normal, weights are randomly assigned to the interconnections 14 between the dummy nodes 16 to form a second artificial neural network.

As shown in FIG. 2B, a second method for establishing the dummy nodes 16 includes a step: finding a plurality of blank nodes or nodes of very low utilization rate from the nodes 12 of the first artificial neural network and setting them as dummy nodes 16. Because the selected nodes are blank or of very low utilization rate, the action of shifting the nodes 12 to be the dummy nodes 16 will not influence the operation of the first artificial neural network. Next, set the weights of the interconnections 14 between the dummy nodes 16 to 0 to form a second artificial neural network 10. In this embodiment, after the second artificial neural network 10 has been trained, random values may be assigned to the interconnections 14 between the dummy nodes 16 to make the second artificial neural network 10 seem a normal artificial neural network. The dummy nodes 16 do not exist conceptually; the interconnections between the dummy nodes 16 are deleted in inference, or the weights of the interconnections 14 are set to 0. Therefore, the action of assigning random values to the interconnections 14 between the dummy nodes 16 during the training process of the second artificial neural network 10 would not influence the succeeding inference.

A third method for establishing the dummy nodes 16 includes a step: adopting a dropout technology during training the first artificial neural network and randomly deleting some nodes or interconnections in iteration of the training process. Firstly, set the dropout ratio to be within (0, 1], i.e. 0<dropout ratio ≤1. Next, set the ratios of all the nodes 12 of the first artificial neural network to 0, and record the training process of the first artificial neural network, wherein a plurality of nodes will be randomly deleted during the training process. Next, select an optimized configuration from the recorded training process of the first artificial neural network, such as a configuration of the lowest mean square loss, the lowest cross entropy loss, the highest similarity, or the highest accuracy, or a combination of at least two of them. Next, restore the deleted nodes of the optimized configuration to their original positions, and set the restored nodes as dummy nodes. Next, randomly assign weights to the dummy nodes to make the dummy nodes seem normal nodes and form a second artificial neural network. Suppose that 20 cycles of iterations are undertaken during the training process and that 50% of nodes are deleted in each cycle of iteration. The configurations of the 20 cycles of iterations will be recorded, and an optimized configuration, such as a configuration of the highest accuracy, will be selected therefrom to function as a second artificial neural network. The deleted 50% of nodes are used as the dummy nodes and stored in the second storage area. The model parameters of the primitive artificial neural network where the 50% of nodes have not been deleted yet are stored in the first storage area. In the example shown in FIG. 2B, the nodes deleted during iteration are restored to function as the dummy nodes.

Figure 4:
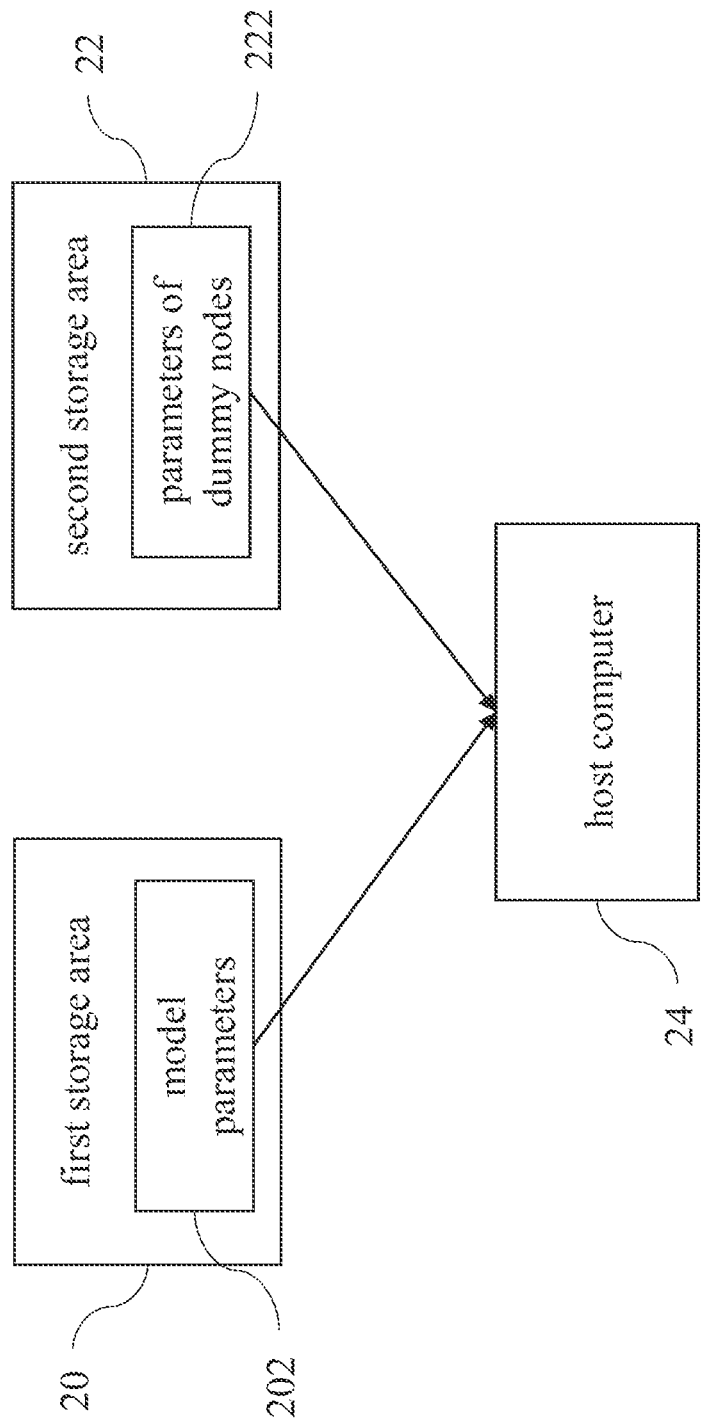
FIG. 4 is a block diagram schematically showing that model parameters and parameters of dummy nodes are respectively stored according to a first embodiment of the present invention.
Figure 5:
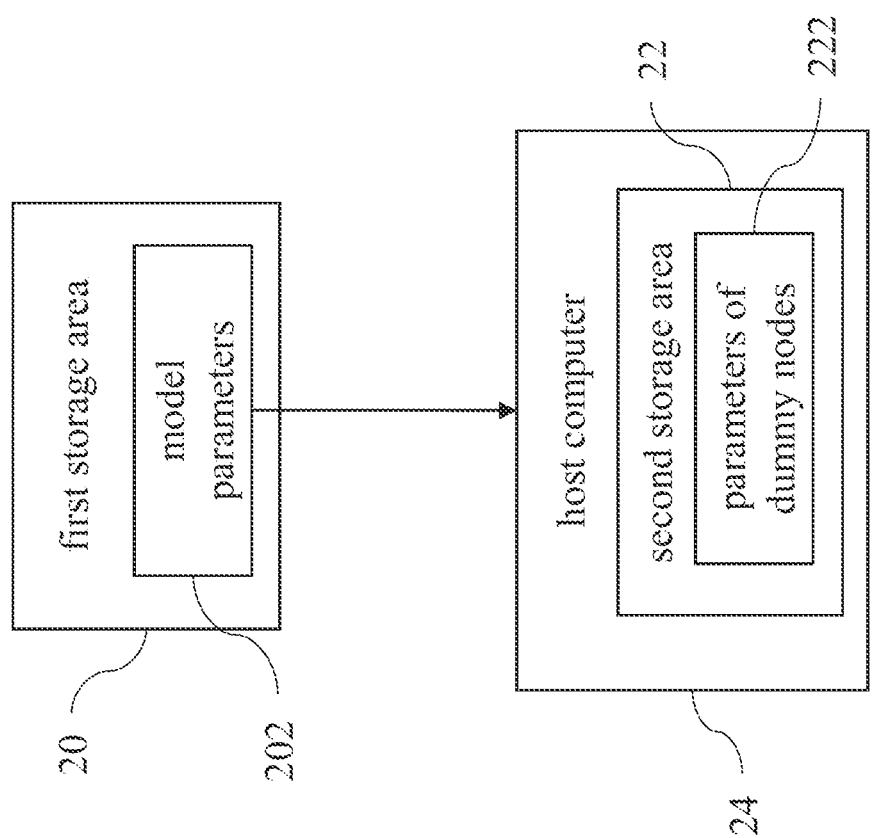
FIG. 5 is a block diagram schematically showing that model parameters and parameters of dummy nodes are respectively stored according to a second embodiment of the present invention.

Refer to FIG. 4 and FIG. 5. In Step S12, respectively store the model parameters of the second artificial neural network and the parameters of the dummy nodes 16 in the first storage area and the second storage area. In a first embodiment shown in FIG. 4, the model parameters 202 of the second artificial neural network are stored in a second storage area 20; and the parameters 222 of the dummy nodes 16 are stored in the second storage area 22; a host computer 24, which is used for interference, is disposed independently. While inference is to be undertaken, the host computer 24 retrieves the model parameters 202 of the second artificial neural network and the parameters 222 of the dummy nodes 16 respectively from the first storage area 20 and the second storage area 22. In a second embodiment shown in FIG. 5, the second storage area 22 is disposed in the host computer 24, which is used for inference. Therefore, the host computer 24 itself has the parameters 222 of the dummy nodes 16. Thus, the host computer 24 can undertake inference as long as the host computer 24 retrieves the model parameters 202 of the second artificial neural network from the first storage area 20. The parameters of the dummy nodes may be stored in a dummy parameter table. In the embodiment of FIG. 2B, the dummy parameter table is exemplified by Table. 1:

| Layer | Positions of dummy nodes |
|---|---|
| First layer | (3) |
| Second layer | (2, 4) |
| Third layer | (1, 3) |
| Fourth layer | (2) |

Table. 1 indicates the following facts of the embodiment of FIG. 2B: in the first layer (i.e. the input layer 102), the third node is a dummy node 16; in the second layer (i.e. the concealment layer 104), the second node and the fourth node are dummy nodes 16; in the third layer (i.e. the concealment layer 104), the first node and the third node are dummy nodes 16; in the fourth layer (i.e. the output layer 106), the second node is a dummy node 16.

In the present invention, it should be particularly mentioned: although the first storage area 20 and the second storage area 22 may be located at the same computer, they are respectively disposed in different databases. While someone does get the model parameters of the second artificial neural network 10, the person neither has the parameters of the dummy nodes nor learns which nodes of the second artificial neural network 10 are dummy nodes. In such a case, the person is unlikely to delete the interconnections of the dummy nodes or set the weights of the interconnections to 0. Thus, the person cannot undertake inference using the second artificial neural network 10.

Below is introduced an example to demonstrate the efficacy of the present invention. Suppose that Company A uses a deep-learning neural network to produce a program and uploads the program to a cloud platform of Company B. In order to prevent the deep-learning neural network from being solely used by Company B, Company A may store the parameters of the dummy nodes in its own platform. While Company B intends to execute the program, Company B needs link to the platform of Company A to acquire the parameters of the dummy model and then acquire the model parameters from its own platform before Company B can use the program to operate the deep-learning neural network for inference. However, Company B would not learn the parameters of the dummy model. Alternatively, Company A may store the parameters of the dummy nodes in a third-party platform.

The embodiments have been described above to demonstrate the principles of the present invention and enable the persons skilled in the art to understand, make, and use the present invention. However, these embodiments are only to exemplify the present invention but not to limit the scope of the present invention. The technical thought and scope of the present invention is defined by the claims stated below and the equivalents thereof. Any modification or variation according to the principle, spirit or embodiment of the present invention is to be also included by the scope of the present invention.

What is claimed is:

1. A storage and inference method for a deep-learning neural network, comprising steps:
    establishing a plurality of dummy nodes in a first artificial neural network to form a second artificial neural network;
    storing model parameters of said second artificial neural network in a first storage area, and storing parameters of said dummy nodes in a second storage area; and
    while an inference is to be undertaken, by a host computer, respectively retrieving, by the host computer, said model parameters of said second artificial neural network and said parameters of said dummy nodes from said first storage area and said second storage area simultaneously; deleting interconnections between said dummy nodes of said second artificial neural network or setting said interconnections between said dummy nodes of said second artificial neural network to 0 according to said parameters of said dummy nodes before said inference,
    wherein a method for establishing said dummy nodes includes steps:
    inserting said dummy nodes into said first artificial neural network to vary an architecture of said first artificial neural network; and generating a plurality of interconnections between said dummy nodes, and randomly assigning weights to said interconnections to form said second artificial neural network.

2. The storage and inference method for a deep-learning neural network according to claim 1, wherein said first storage area and said second storage area are respectively disposed in different databases.

3. The storage and inference method for a deep-learning neural network according to claim 1, wherein said first storage area and said second storage area are linked to the host computer for undertaking inference.

4. The storage and inference method for a deep-learning neural network according to claim 1, wherein said first storage area and said second storage area are disposed in the host computer, and said host computer is used for inference.

5. A storage and inference method for a deep-learning neural network, comprising steps:
establishing a plurality of dummy nodes in a first artificial neural network to form a second artificial neural network;
storing model parameters of said second artificial neural network in a first storage area, and storing parameters of said dummy nodes in a second storage area; and
while an inference is to be undertaken, by a host computer, respectively retrieving, by the host computer, said model parameters of said second artificial neural network and said parameters of said dummy nodes from said first storage area and said second storage area simultaneously; deleting interconnections between said dummy nodes of said second artificial neural network or setting said interconnections between said dummy nodes of said second artificial neural network to 0 according to said parameters of said dummy nodes before said inference,
wherein a method for establishing said dummy nodes includes steps:
finding a plurality of blank nodes from a plurality of nodes of said first artificial neural network, and setting said blank nodes to be said dummy nodes; and
setting a plurality of weights of said interconnections between said dummy nodes to 0 to form said second artificial neural network.

6. The storage and inference method for a deep-learning neural network according to claim 5, wherein after said second artificial neural artificial network has been trained, random values are assigned to said weights of said interconnections between said dummy nodes.

7. A storage and inference method for a deep-learning neural network, comprising steps:
establishing a plurality of dummy nodes in a first artificial neural network to form a second artificial neural network;
storing model parameters of said second artificial neural network in a first storage area, and storing parameters of said dummy nodes in a second storage area; and
while an inference is to be undertaken, by a host computer, respectively retrieving, by the host computer, said model parameters of said second artificial neural network and said parameters of said dummy nodes from said first storage area and said second storage area simultaneously; deleting interconnections between said dummy nodes of said second artificial neural network or setting said interconnections between said dummy nodes of said second artificial neural network to 0 according to said parameters of said dummy nodes before said inference,
wherein a method for establishing said dummy nodes includes steps:
while said first artificial neural network is being trained, setting a dropout ratio to be greater than 0 and smaller than or equal to 1;
setting ratios of all nodes of said first artificial neural network to 0, and recording a training process of said first artificial neural network, wherein a plurality of said nodes is randomly deleted in said training process;
selecting an optimized configuration from said training process of said first artificial neural nodes, and restoring said nodes of said optimized configuration, which are deleted, to original positions; setting nodes, which are restored to said original positions, to be said dummy nodes; and
randomly assigning weights to interconnections between said dummy nodes to form said second artificial neural network.

8. The storage and inference method for a deep-learning neural network according to claim 7, wherein said optimized configuration involves a configuration of lowest mean square loss, lowest cross entropy loss, highest similarity, or highest accuracy, or involves a combination of at least two of them.

* * * * *